July 10, 1962   G. W. MAXON, JR   3,043,201
MACHINE FOR DISTRIBUTING FLOWABLE MATERIALS
Filed May 8, 1958                    10 Sheets-Sheet 1

INVENTOR.
GLENWAY W. MAXON, JR.
BY
Marechal, Biebel, French & Bugg
ATTORNEYS

July 10, 1962  G. W. MAXON, JR  3,043,201
MACHINE FOR DISTRIBUTING FLOWABLE MATERIALS
Filed May 8, 1958  10 Sheets-Sheet 3

INVENTOR.
GLENWAY W. MAXON, JR.
BY
Marechal, Biebel, French & Bugg
ATTORNEYS July 10, 1962  G. W. MAXON, JR  3,043,201
MACHINE FOR DISTRIBUTING FLOWABLE MATERIALS
Filed May 8, 1958  10 Sheets-Sheet 9

INVENTOR.
GLENWAY W. MAXON, JR.
BY
Marechal, Biebel, French & Bugg
ATTORNEYS

United States Patent Office 3,043,201
Patented July 10, 1962

3,043,201
MACHINE FOR DISTRIBUTING
FLOWABLE MATERIALS
Glenway W. Maxon, Jr., Dayton, Ohio, assignor to Maxon Construction Company, Inc., Dayton, Ohio, a corporation of Ohio
Filed May 8, 1958, Ser. No. 733,949
7 Claims. (Cl. 94—46)

This invention relates to a machine for distributing flowable materials, especially for distributing concrete in paving operations and the like.

Concrete used in paving, particularly for highways, is preferably of the type known as "low slump" concrete. The wet or uncured concrete is relatively stiff, though plastic, due principally to a high ratio of solids to liquid. Most paving specifications of governmental agencies specify a low slump concrete be used in highway construction.

When building roads with such low slump concrete it is desirable to avoid segregation of the mix as much as possible during handling and placing. One of the times during which such undesirable segregation may occur is during the distributing of the concrete between the paving forms, and thus it is desirable to deposit the wet concrete substantially in the final form or shape for curing, with as little segregation as possible, and with only subsequent surface finishing operations being needed to prepare the concrete for curing.

Therefore, the primary object of this invention is to provide an improved machine for distributing flowable materials, particularly for use in paving with concrete.

Another object of this invention is to provide such a distributing machine which is self-contained, being self-powered and propelled and including power operated devices for controlling the forward motion of the machine, the traverse of the distributing bucket, the depth of the layer of material distributed from the bucket, and, if desired, the size of the discharge orifice through which the material flows from the bucket.

A further object of the invention is to provide such a machine with a central control station and suitable controls located there for operating all of the aforementioned functions of the machine, thereby enabling a single operator to control the entire machine.

An additional object of the invention is to provide suitable readily made adjustments in the traversing path of the bucket and in the contour of the screed of such a distributing machine, so that the concrete may be distributed and struck off either in a planar surface or in a crowned surface, higher in the center than at the opposite sides, as selected for the particular paving job.

Another object of this invention is to provide a distributing machine for paving materials, such as concrete, which machine may be easily adapted to lay different widths of pavement.

A further object of the invention is to provide such a machine which includes an oscillating type finishing screed including mountings therefor providing for selectively moving the finishing screed between operative and non-operative positions, and also including provisions to adjust the screed for flat or crowned paved surfaces.

Another object of the invention is to provide in such a machine control of the length of strike and oscillating frequency of the finishing screed.

Other objects and advantages of the invention will be apparent from the following description, the accompanying drawings and the appended claims.

Figure 1:
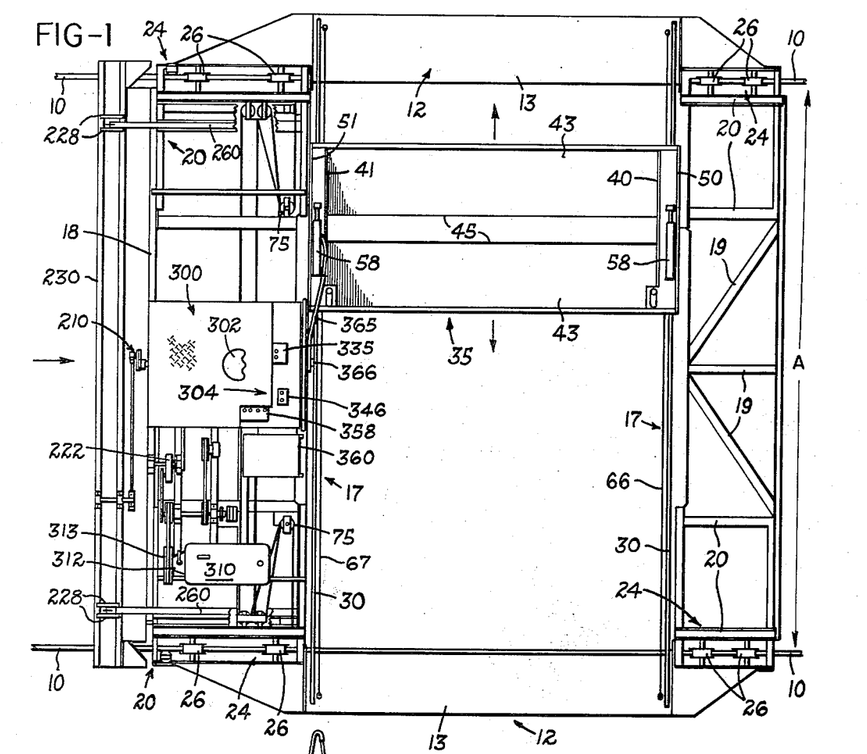
FIG. 1 is a plan view of a preferred embodiment of the distributing machine provided by this invention.
Figure 2:
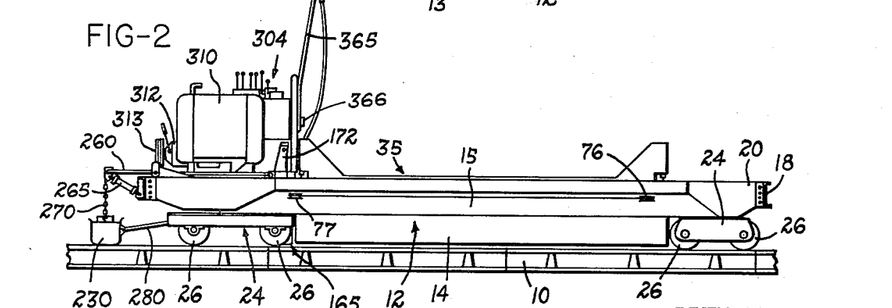
FIG. 2 is a side elevational view of the machine shown in FIG. 1.

Referring to the drawings, which illustrate preferred embodiments of the present invention, the overall arrangement of the distributing machine is shown in FIG. 1 wherein the area to be paved is designated by the letter A, and is defined by rail-like paving forms 10 which are fixed to the ground on opposite sides of area A in the usual manner to define the lateral limits of the roadway or other area to be paved.

Figure 3:
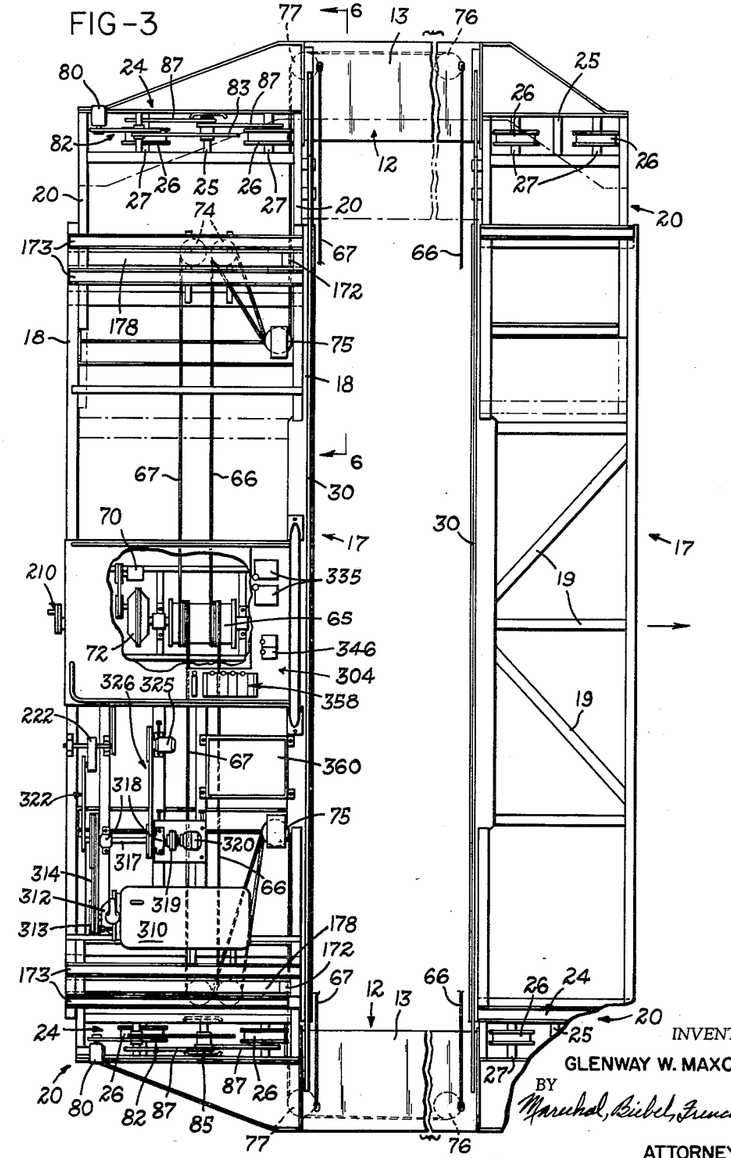
FIG. 3 is an enlarged view, similar to FIG. 1, with the side rails broken to facilitate illustration, and with portions of the operator's platform broken away to show details of the bucket traversing mechanism.
Figure 4:
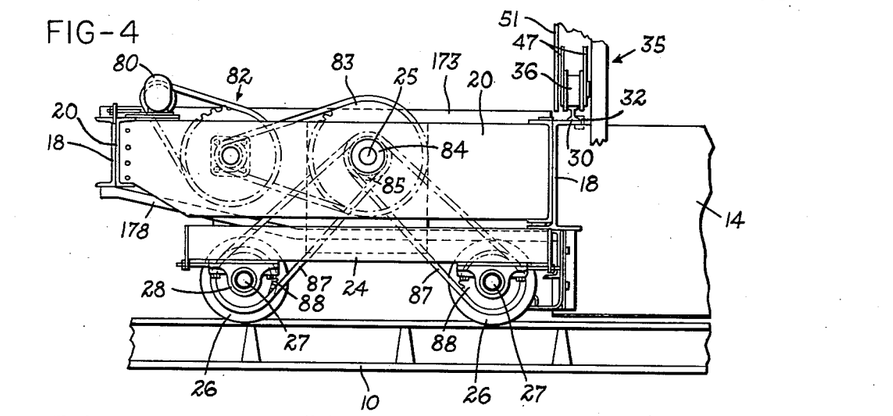
FIG. 4 is a detailed view on an enlarged scale of a traction truck of the distributing machine, specifically, that truck at the lower left corner of FIG. 3.
Figure 5:
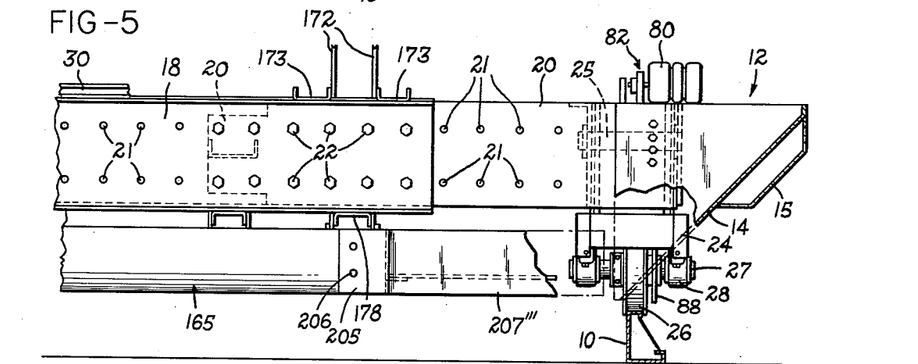
FIG. 5 is an elevattional view, with parts broken away, looking from the left hand side of FIG. 4.
Figures 6, 7:
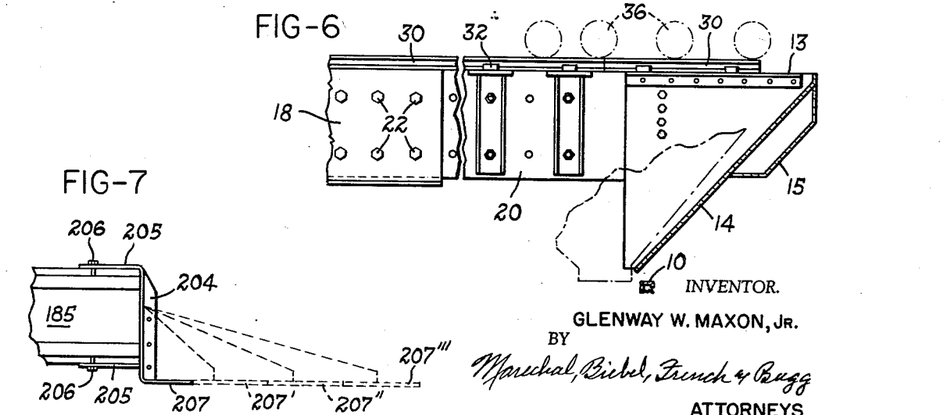
FIG. 6 is a partial section taken on an enlarged scale along lines 6—6 on FIG. 3.
FIG. 7 is a detail view of one end of the strike-off screed which is shown in FIGS. 4 and 5, as viewed from the top in FIG. 5 illustrating in dotted lines the positioning of different lengths of extension members used in adapting the machine to laying pavement of greater width.

The distributing machine is designed to travel upon forms 10, and the machine includes a main frame provided by built-up side rail members 12 each including an upper generally horizontal plate 13 from which extends a side plate 14, in a downwardly and inwardly direction as shown in FIGS. 5 and 6. A reinforcing channel 15 is secured, as by welding, at one end to the corner of the outer upper corner of the side rail member, and at the other end to the slanted side plate 14. Front and back frame rails are provided in the form of truss constructions 17, each of which includes at its opposite sides channel members 18, as shown for example in FIG. 4, and connected by cross braces or truss beams 19 (FIGS. 1 and 3).

At the corners of the main frame front and back extension parts are provided in the form of frameworks 20 secured to the opposite ends of the side rails 12, and slidably received between the outwardly facing channel members 18 of the front and rear cross members, as shown particularly in FIGS. 4 and 5. A series of equally spaced holes 21 are provided in the mating parts of these members, as shown in FIG. 5, and bolts 22 are passed through aligned pairs of these holes to secure the extension members 20 in adjustable relation to the front and rear frame members, respectively. In this manner, by removing bolts 22 and adjusting the position of the extension members 20, the width of the machine frame may be varied to suit different widths of pavement.

Each of the frame extension members 20 carries a wheel truck 24, each of which is supported on a pin 25 within the frame extension members 20, as shown in FIGS. 4 and 5, providing a pivot mounting for each of the wheel trucks. Suitable wheels 26 are carried on axles 27 supported in bearings 28 which are in turn secured to the wheel trucks in any manner suitable to maintenance and adjustment of tension in the drive chains.

On the inward channels 18, as shown particularly in FIGS. 4 and 6, there are supported rails 30 which are held upon the associated channel member 18 by suitable removable clips 32 (FIG. 4). These rails 30 provide support for a distributing bucket 35 which is carried by rollers 36 for movement transversely of the main frame, in a direction, therefore, normal to the direction of movement of the main frame over the form rails 10.

*Distributing Bucket*

Figure 8:
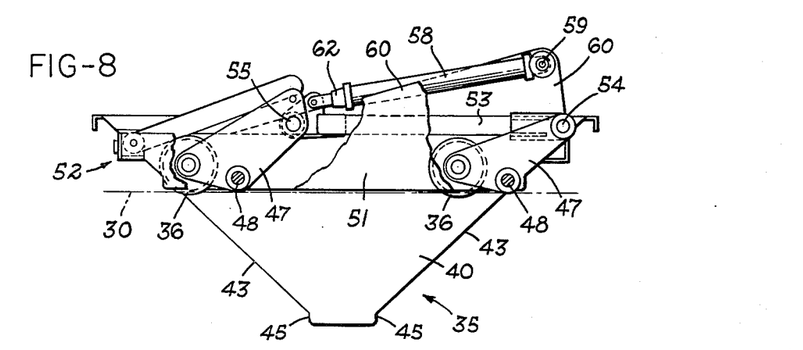
FIG. 8 is a side plan view on an enlarged scale of one type of distributing bucket.

The distributing bucket is formed of front and back plates 40 and 41 of generally triangular inverted shape, and opposite side walls 43 extending downwardly and inwardly in converging relation, terminating in lip members 45 at the bottom which define a discharge orifice of generally rectangular cross-section. The material to be distributed is dumped into this bucket and is distributed through the discharge orifice.

As will be obvious upon inspection of the drawings, the thickness of the layer or ribbon of material discharged from the bucket will depend upon the height of the discharge orifice above the subgrade to be paved. This height preferably is adjustable for varying the depth of the material, as when laying concrete, and for this purpose each of the bucket wheels 36 is journaled upon its individual bell crank member 47, and the bell crank members are in turn pivoted upon pins 48 fixed to the outer end plates 50 and 51 at the front and rear of the bucket, forming part of the bucket frame 52. The bell crank members at each end of the bucket are connected by a tie-rod 53 having pivotal connections 54 and 55 with the bell cranks 47, and the connection 55 also is secured to one of the moving elements of a hydraulic piston-cylinder motor 58, with the other element of this motor being pivotally fixed at 59 between flange members 60 extending upwardly from the end plates 40 and 41, and the outer end plates 50 and 51, respectively.

It will be understood that the bell crank, tie-rod, and hydraulic motor construction is duplicated at the forward and rearward ends of the bucket, and that these motors may be operated simultaneously so as to pivot the axis of rotation of each wheel, moving the wheel in a generally vertical direction with respect to a horizontal plane passing through the bell crank pivot points 48. Thus, expansion of the hydraulic motors will cause counterclockwise pivoting of the bell crank members as viewed in FIG. 8 with resultant raising of the discharge orifice, and contraction of these motors will in turn lower the orifice. A manually adjustable stop 62 provides a means for setting the orifice elevation at a desired level above the subgrade.

*Bucket Traverse Drive*

The bucket 35 is caused to traverse the main frame through a winch 65 and suitable operating cables, cable 66 controlling the front of the bucket and cable 67 controlling the rear of the bucket. These cables are suitably secured to the forward and rearward parts of bucket frame 52 and wrapped about the winch drum as shown in FIG. 3 and secured at their ends to the drum in suitable manner (not shown), so that rotation of the drum will pay out the cables on one side and take up the cable on the other side, in conventional manner, to pull the distributing bucket across the main frame. The winch is driven by a hydraulic motor 70 through a suitable gear reducer 72.

The cables 66 and 67 pass from the winch drum to guide pulleys 74 which are mounted on the rear main frame member 17, at opposite ends thereof, as shown in FIG. 3, and from these pulleys 74 the cables pass around double sheaves 75 carried on the frame extension members 20. From the sheaves 75 the cables pass around further guide pulleys 76, for the forward cable 66, and 77 for the rear cable 67, these pulleys 76 and 77 being suitably mounted in the frame side members 12. This arrangement, as will be evident upon inspection of FIG. 3, serves to pay out cable when the frame extensions 20 are moved outwardly to expand the width of the main frame, and to take up cable when the main frame is reduced in size.

*Distributing Operation*

The basic operation of the machine, then, is as follows. Freshly mixed concrete is carried to one side of the machine, as by a suitable truck, and the bucket 35 is moved to that side and filled with concrete from the truck. The hydraulic motor 70 is then caused to operate and traverse the bucket with the concrete passing through the discharge orifice and being distributed between the forms 10 at a depth which is determined by the vertical distance between the path A and the lower edge of the discharge orifice on the bucket, particularly the trailing edge thereof which acts as a sort of scraper to level the concrete as it is distributed. The concrete is thus distributed in a succession of adjacent layers or ribbons with the entire machine being advanced over the forms between successive distributing operations. In one embodiment of the machine a bucket having a discharge orifice of a length of twelve feet is thus able to distribute, in the direction of the roadway being paved, successive twelve foot strips of concrete in the area to be paved, normal to the forms 10.

Motive Drive

The drive for advancing the machine between such distributing operations may be provided by any suitable mechanism for rotating one or more of the wheels of the trucks 24. A suitable drive arrangement is disclosed in FIGS. 4 and 5, wherein reversible hydraulic motors 80 are supported on the rear extension members 20 at the rearward corners of the machine. Referring to FIG. 4, these motors drive both wheels of the rear trucks 24 through a suitable gear and sprocket reduction drive, indicated generally at 82, which in turn drives a main sprocket 83 mounted to rotate on the truck support pin 25 upon a collar 84. Also on this collar are fixed drive sprockets 85 which mesh with drive chains 87, and these chains in turn drive sprockets 88 fixed to axles 27. By selective operation of the motors 80 the machine may be driven in forward or reverse directions over the rail forms 10.

Adjustable Orifice

The bucket construction shown in FIG. 8 is suitable in many types of paving operations, but it also has been found desirable to provide a modified bucket including apparatus for adjusting the size of the discharge orifice. There are a nuumber of reasons for providing such an adjustment, among them the desirability of providing an adjustable orifice to compensate for slight changes in slump of the concrete being distributed. As explained in the introduction to the specification, paving operations generally require a low slump concrete. One suitable method of paving to which this particular machine is adapted is that in which the concrete is mixed in large batches at a central mix concrete plant, where the consistency of the concrete may be carefully controlled. Special trucks are then provided which can convey the concrete from this central mix concrete plant to the distributing machine. Even under such circumstances there may at times be some slight variations, within tolerable limits, of the slump of the concrete, and thus it may happen that successive loads being distributed from the bucket will vary slightly in slump characteristic.

A given setting of the discharge orifice for low slump concrete may be slightly too large for concrete having a somewhat higher slump. As a result the higher slump concrete may tend to flow more readily through the wider discharge orifice and hump or mound behind the trailing edge of the discharge orifice as the bucket traverses. By decreasing the orifice size this tendency to mound during distribution may be controlled to the point where it is substantially eliminated. Accordingly, referring to FIGS. 9 and 10, a suitable discharge orifice control for the distributing bucket is shown. The same general reference numeral 125 is used to indicate this modified bucket generally, and parts identical to those in the bucket 25 are designated by the reference numerals in the 100 series. For example, the bucket 125 includes the height control motors 148 and their corresponding outer end supporting plates 140 and flange members 150. The stationary side 133 of bucket 125 is fixed to the opposite end plates 130, and between these end plates is an adjustable opposite side 134 having side plates 136 which are pivoted at 152 to the stationary side plates 130. The supporting channels 153 (FIG. 10) are provided to stiffen the side walls 133 and 134.

Figure 10:
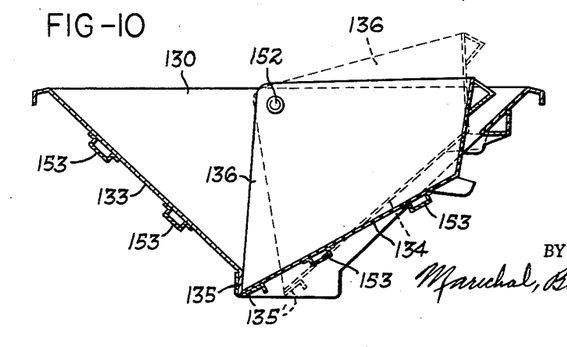
FIG. 10 is a vertical section taken through the center of the bucket shown in FIG. 9, illustrating in dotted lines certain movable parts thereof in adjusted position.

The discharge opening or orifice is then controlled by pivoting the adjustable side 134 about the pivots 152, for example as between the positions shown in full and dotted lines in FIG. 10. This adjusting movement is supplied by hydraulic piston-cylinder motors 155 which have a pivotal mounting 156 at one end upon the stationary side plates 130, and a further pivotal mounting 157 at their other end between suitable U-shaped supports 158 which are in turn connected through gusset plates 159 to the movable side plates 136. As will be obvious from an inspection of the drawings, expansion or contraction of the motors 155 will result in opening or closing of the discharge orifice, with the orifice being completely closed when the motors are contracted to bring the lower lip 135' of adjustable side 134 into contact with the opposite lip portion 135 of the stationary side 133.

Strike-Off Screed

The distributing machine includes an adjustable strike-off screed the height of which may be adjusted, for example to correspond to the height of distributing bucket 35, and the width of which may be adjusted to correspond to the width between the forms 10. This screed member is indicated generally in FIGS. 4, 5, and 11–14 at 165. The construction of the screed includes channel members 167 and 168 which are suspended in parallel spaced relation. These channel members are secured adjacent their opposite ends to cross plates 170 (FIG. 12) which form part of height adjusting members 172 extending upwardly between cross members 173 of the main frame. The height adjusting members 172 are free to move in a vertical direction between the frame parts 173, as shown by full and dot-dash lines in FIG. 11, this movement being effected by hydraulic piston-cylinder motors 175 (FIGS. 11 and 12) which are secured to a pivot pin 176 at the top of the height adjusting members and to pins 177 which are fixed to a cross member 178 of the main frame. Thus, the entire structure, including the channels 167 and 168 and the vertically extending parts 172, is vertically adjustable with respect to the main frame of the machine.

The suspension for this mechanism is in the nature of a leading-arm type suspension, including for each of the vertical members 172 an upper arm 180 pivotally connected at one end to a frame cross member 181 and at its other end to member 172, and a lower arm 182 pivotally connected at one end to frame member 178 and at its other end to a gusset plate 183 which is in turn secured to the rear channel 167. The vertical motion of this linkage will be apparent from an inspection of FIG. 11.

The strike-off screed itself includes, in addition to the above described height adjustment, an adjustment for the contour thereof, i.e., from flat or planar to crowned configuration. Thus, the strike-off part itself is provided by an elongated relatively deep channel member 185 of generally U-shape in cross-section having a number of vertical slits 186 (FIG. 12) in the side walls thereof, each slit being covered by a small plate 187 which is tack welded or otherwise suitably secured along one side to a surface of the channel member 185 to cover the slit. These slits permit a controlled bending of the channel member 185 under the influence of contour control apparatus which includes end pieces 190 secured to the bottom surface of member 185 and opposite ends of channels 167 and 168. Also, member 185 is connected through links 192 to bell crank members 194, each of which is pivotally fixed at 195 to either the front channel 168 or rear channel 167, as shown in the drawings.

Figure 14:
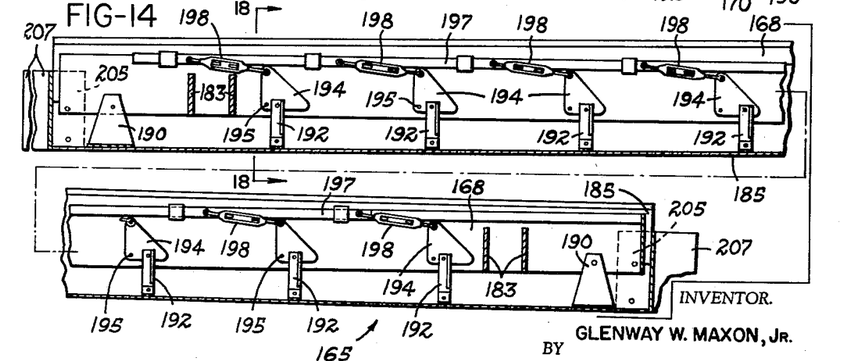
FIG. 14 is an enlarged section taken vertically through the center of the screed in FIG. 12, and illustrating the details of the mechanism for adjusting contour of the screed from flat to crowned configuration.

It will be noted that the length of the lever arm between the pivot supports 195 and the connection with an associated arm 192 differs on each of the bell crank members 194, the length of this lever arm being progressively greater toward the center of the screed member, as will be obvious from an inspection of FIG. 14. Accordingly, an equal angular movement of each of the bell cranks 194 will produce different vertical displacements of the associated arms 192 such that those in the center of the screed member will be displaced progressively more than those toward the opposite ends of the screed.

The equal rotation of bell cranks 194 is provided by a common control rod 197 which is connected to each of the bell crank members 194 by an adjustable link 198, these turn-buckles providing for adjustment to attain the desired alignment and movement of the bell cranks. Lateral movement of the control rod 197 is provided by a conventional jack screw operator 200 (FIG. 15) which is connected to rotate one of the bell crank members 194', which in turn is connected to rod 197 by a connecting rod 202. Thus, by rotating the jack screw and causing the requisite lateral movement of control rod 197, the contour of the screed channel 185 may be altered from flat to crowned as desired.

The operation of the machine as thus far described, is briefly as follows. Concrete is conveyed to one side of the machine in a truck or the like and dumped into bucket 35. The bucket is caused to traverse by operating the hydraulic motor 70 which drives the winch, and the concrete is flowed upon the surface between the forms 10 at a height determined by the height of the bucket discharge orifice. This height is in turn adjusted by control of the hydraulic motors 58. After a layer of concrete has been distributed, the machine is moved forward over the forms by powering the drive or traction motors 80. With the strike-off screed 165 adjusted to the proper height by control of hydraulic motors 175, and with the surface thereof adjusted to the desired planar or crowned configuration by the jack screw mechanisms 200, as the machine moves forward the screed channel member 185 will strike off the distributed concrete at the desired level.

The length of the strike-off screed must, of course, be extended when the main frame of the machine is extended to distribute concrete over a wider space. Therefore, the above described screed construction is of a length, across the machine, corresponding to the smallest width to which the frame may be set, and suitable extension members in the form of L-shaped brackets 204 can have their projecting spaced parts 205 secured by bolts 206 to the ends of the screed outer member 185. The width covered by the strike-off screed may, therefore, be varied by so adding strike-off extension pieces 204 having strike-off legs 207 of various lengths, as shown in dotted lines in FIG. 7, and designated by reference numerals 207', 207" and 207'''.

Finishing Screed

FIGS. 1, 2 and 16–19 illustrate a finishing screed construction which is suspended from the rear of the distributing machine. This screed is in the nature of an oscillating-type finishing screed which, as is well known in the art, is caused to traverse the concrete as it rides just above the forms, and thus to "float" the concrete in a preliminary finishing operation. The drive for this screed includes an eccentric crank member 210 mounted upon the end of a shaft 212 which is supported on cross members of the rear main frame truss 17, extending through suitable bearings 213. Shaft 212 carries a sprocket 215 which is driven by a chain 216 extending around a further sprocket 218, which is in turn connected through a manually operable clutch 219 to the output shaft 220 of a gear reduction unit 222. The oscillating frequency of the screed may be varied by changing the drive ratio and/or engine speed, for example, and the length of strike may be changed by varying the eccentricity of crank 210 in any suitable manner. This drive may be disconnected when desired, of course, by disengaging clutch 219.

Figures 11, 13:
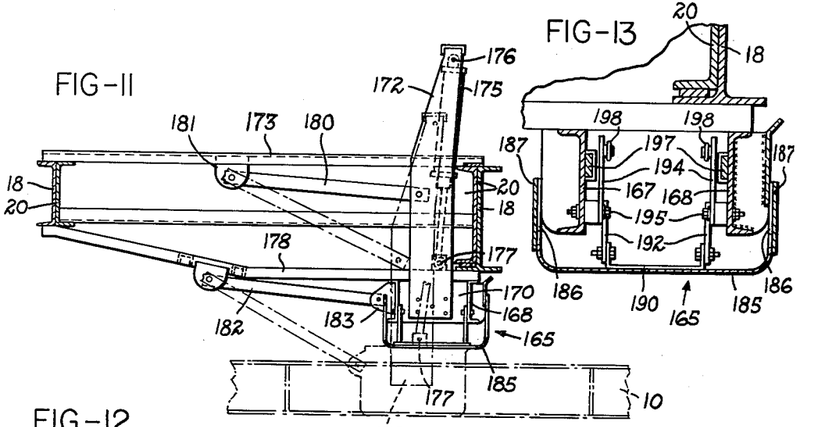
FIG. 11 is a detail view of the adjustable mounting mechanism for the strike-off screed.
FIG. 13 is a section on an enlarged scale taken on line 13—13 of FIG. 12.
Figures 12, 15:
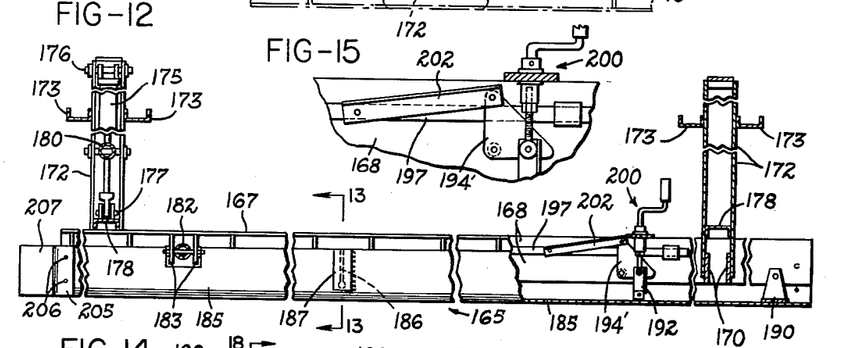
FIG. 12 is a further detail view of the strike-off screed and its mountings.
FIG. 15 is an enlarged detail view of the adjusting mechanism for controlling contour of the strike-off screed.
Figures 16, 17, 18, 19:
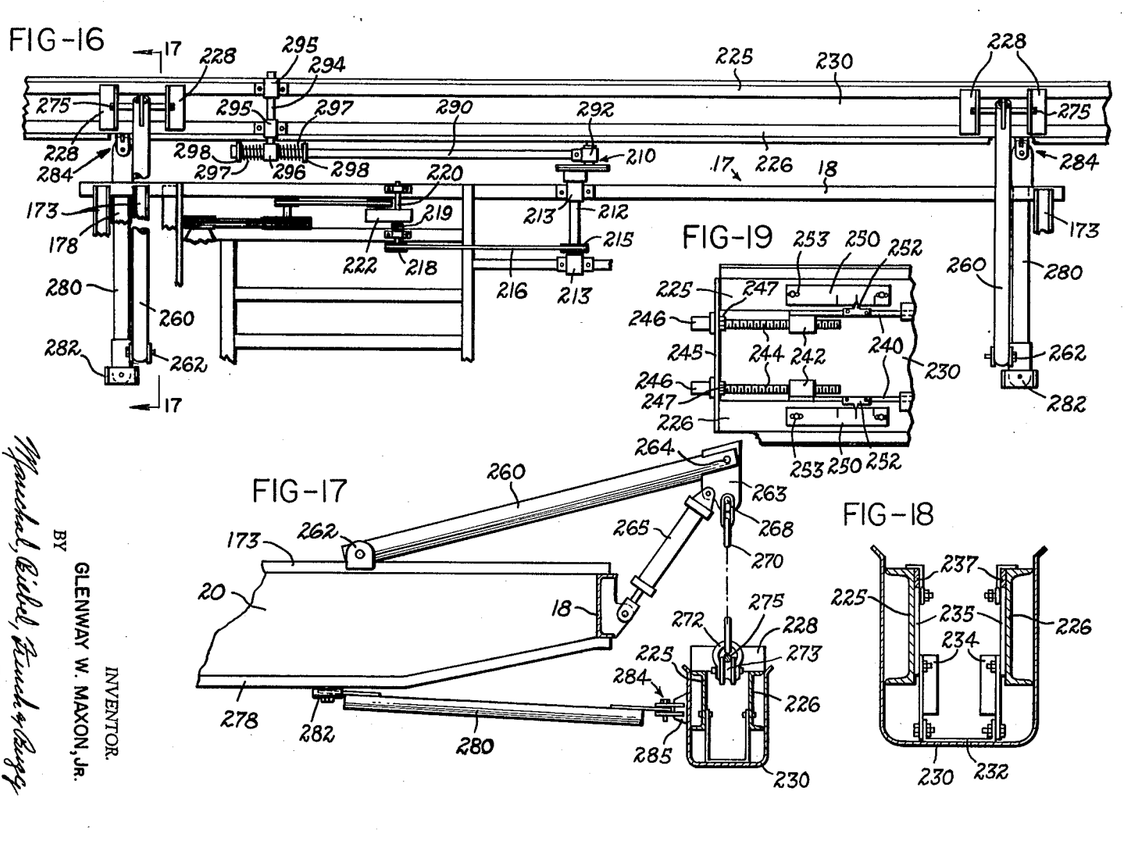
FIG. 16 is an enlarged plan view of portions of the finishing screed, the mounting mechanism therefor, and the apparatus for producing oscillatory movement of the finishing screed.
FIG. 17 is an enlarged sectional view taken on line 17—17 of FIG. 16.
FIG. 18 is a section on an enlarged scale taken on line 18—18 in FIG. 14, and showing the detailed inner construction of the strike-off screed, the same details of construction being applicable to the finishing screed shown in FIGS. 16 and 17.
FIG. 19 is a detail view of the mechanism on the finishing screed which controls the contour thereof.

The cross-section of the finishing screed is shown in FIGS. 17 and 18, and, as will be noted, corresponds generally to the cross-section of the strike-off screed as shown in FIG. 13. Thus, the finishing screed includes channel members 225 and 226 which extend parallel to each other and which are secured, as by welding, to transverse angle members 228 (FIG. 16). The exterior or actual screed member is provided by an outer channel 230 of generally deep and elongated U-shape cross-section to which is secured, on the inside of the bottom thereof, a further channel member 232. Pivotally connected to channel 232 are the adjusting links 234 which in turn have a pivotal connection with suitable bell crank members 235, and to these bell crank members are attached adjusting rails 237 which perform the same functions as the rod 197 in FIG. 14.

Lateral movement of the adjusting rails 237 is controlled by straps 240 (FIG. 19) fixed to the ends thereof and carrying adjustment nuts 242 into which are threaded adjusting screws 244. These screws extend through a cross plate 245 which is secured to the channels 225 and 226 at one end thereof, with the heads 246 projecting on the outer side of plate 245. Suitable lock nuts 247 may be provided to retain screws 244 in a desired position. Preferably, this construction also includes indicator plates 250 mounted on the channels 225 and 226, respectively, and having suitable index marks thereon, as shown in FIG. 19, cooperating with pointers 252 which are carried by the straps 240. These plates are adjustably mounted, as through slots 253, in order to set the screed at zero crown.

Thus, in the same general manner as previously described in connection with the strike-off screed, the contour of the finishing screed may be adjusted by turning the adjustment screws 246 to produce longitudinal movement of the rails 237 and consequent turning of the bell crank members 235 to produce vertical adjusting movement of the links 234. It will be understood that the lever arms between the various sets of links 234 and associated bell cranks 235 will be progressively greater from the ends toward the center of the finishing screed, in the same manner as described above in the adjustment mechanism for the strike-off screed.

The finishing screed is supported in suspended relation from the rear frame truss 17 by arms 260 which have a pivotal mounting 262 on the machine frame, and which at their other ends carry plates 263, which are received in slots at the outward ends of arms 260 and secured thereto by pins 264. A piston-cylinder hydraulic motor 265 extends between each plate 263 and the rear channel 18 of the frame truss member 17, to provide control over the pivotal movement of arms 260 about the fixed pivot connections 262.

A pin 268 on each of the plates 263 engages the uppermost link of a suspension chain 270, and the lowermost link of the chain carries a hanger member 272 including a roller 273 extending beneath a cross pin 275 which is secured between adjacent pairs of the cross members 228 of the screed. The finishing screed thus is suspended for movement relative to the distributing machine at the rear thereof.

The motion of the finishing screed is confined to a generally transverse path, with respect to the direction of motion of the machine, by guide arms 280 having pivotal connections 282 at the forward ends thereof with the machine frame, and which have pivotal connection 284 at the rearward ends thereof with suitable mounting brackets 285 fixed to the forward side surfaces of the finishing screed. The arms 280 thus, in cooperation with the screed itself, form a type of parallel linkage which guides the movement of the finishing screed.

The motion of the eccentric 210 is conveyed to the finishing screed by a drive arm 290 which carries a bearing 292 at one end thereof fixed to the eccentric member 210, and which at its other end has a lost-motion type connection with the finishing screed. This connection includes cross arm 294 mounted in brackets 295 which are fixed to the upper surface of channels 225 and 226, and this arm carries a hollow block 296 at its forward end through which drive arm 290 is passed. Springs 297 engage opposite sides of block 296 and are received coaxially upon drive arm 290. These springs engage at their outer ends collars 298 which are suitably fixed to drive arm 290. Thus, rotation of eccentric member 210 will produce a vibratory movement of the finishing screed, and the screed will be moved forward over the concrete as the entire machine advances over rail forms 10 between distributing operations.

Control System

One of the important features of the present invention is to provide a distributing machine which is completely self-contained, and which includes a central control console at an operator's station for governing the movement of all the various above described parts during distributing operations. Thus, referring to FIGS. 1–3, a central control station is provided by a platform 300 centrally of the rear frame truss 17, and including a seat 302 for an operator before a control console indicated generally at 304. At this console the various control valves of the hydraulic system, shown schematically in FIG. 20, are mounted within easy reach of the operator.

Referring to FIGS. 1–3 and 20, motive power is provided by a suitable prime mover 310, preferably an internal combustion engine, and having an output transmission 312 driving an output pulley 313, which, through suitable V-belts 314, drives a sheave 315 which is mounted upon a countershaft 317. This countershaft is supported in suitable bearings 318 on the frame, and is connected through a coupling 319 to tandem hydraulic pump unit 320.

Countershaft 317 also is connected through a suitable V-belt or chain and sprocket drive, indicated generally at 322, to the gear reduction unit 222 which drives the finishing screed, as previously described. A further tandem hydraulic pump unit 325 is also driven from shaft 317 through a suitable V-belt and pulley drive indicated generally at 326.

Figure 20:
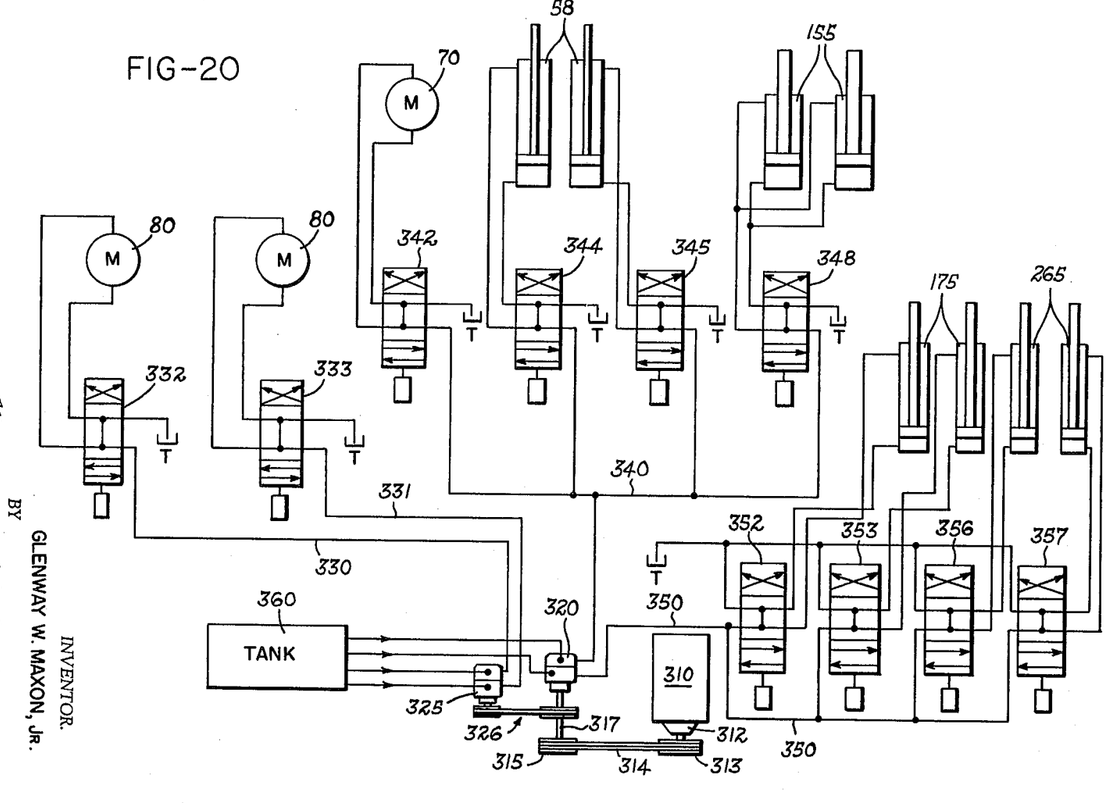
FIG. 20 is a schematic diagram of the hydraulic control and drive system for the distributing machine shown in FIG. 1.

Referring to FIG. 20, each section of the hydraulic pump unit 325 is connected through separate output lines 330 and 331 to separate 3-position hydraulic control valves 332 and 333, respectively, which are connected as shown to control the flow, and direction of flow, of pressure fluid to the traction motors 80. Thus, manual operation of the valves 332 and 333 will supply pressure fluid to motors 80 in either direction providing for forward and reverse drive of the traction wheels on the rear trucks, to control movement of the machine over the rail forms 10. Preferably the manual operators for these valves are mounted together, as indicated generally at 335 in FIG. 1, such that the operator may control them simultaneously with one hand. If a wider range of motive speeds is desired additional pump units may be connected in parallel with pump 325 and selectively placed in or out of the circuit to increase or decrease the flow to motors 80 in conventional manner.

One of the sections of pump 320 is connected to a trunk pressure line 340 which supplies pressure fluid through a bank of control valves as follows. A first manually operated 3-way hydraulic valve 342 controls the flow and direction of flow of pressure fluid to the winch drive motor 70, governing the traversing motion of distributing bucket 35. Valves 344 and 345 are connected to control the flow and direction of flow of pressure fluid to the bucket height adjusting motors 58. Again, these two valves are mounted side by side on the console, as shown at 346, such that the operator may grasp both manual controls for these valves in a single hand and move them simultaneously. However, these valves may be operated independently of each other to lift one edge of the orifice of the distributing bucket slightly above the other, as may be desirable in some instances. These valves, therefore, provide control over the depth of the layer or ribbon of material distributed by the bucket during traverse thereof across the machine frame. Finally, a 3-way valve 348 is connected between the trunk line 340 and the orifice adjusting motors 155, these motors being connected in parallel, as shown, to be under the control of the single valve 348. This valve, therefore, provides to the operator control over the orifice opening as previously described in connection with FIGS. 9 and 10.

The second unit of pump 320 has its output connected to a further trunk line 350 which supplies hydraulic fluid under pressure through 3-way control valves 352 and 353 to the piston cylinder motors 175 which control the height of the strike-off screed. These valves preferably also are mounted side by side such that the operator can control their movements simultaneously with a single hand. In like fashion, 3-way valves 356 and 357 are connected each to control the flow and direction of flow of pressure fluid to the finishing screed height control motors 265. Again, the control arms for these motors are mounted side by side for simultaneous movement, if desired.

The pumps 320 and 325 draw hydraulic fluid from a suitable supply tank 360, and return flow from the various above described control valves is to such tank, the return lines in each case having been terminated in the conventional tank symbol, as is common in such diagrams, to simplify illustration of the system. It should be noted also that the control lines between valves 344, 345 and 348 and the motors 58 and 155 include suitable flexible hydraulic hose which is supported by a boom 365 pivotally mounted at 366 (FIG. 1) on the machine frame directly in front of the operator's station, to provide the requisite flexible connection to these motors during traversing movement of the distributing bucket.

*Modified Construction*

A modified type of distributing machine in accordance with the invention is illustrated in FIGS. 21–30, wherein the main frame is provided by side rails 412 and front and back rails in the form of truss constructions 415, at the front, and 416 at the rear. These truss constructions include vertically extending framework, as shown, which provide the necessary rigidity in the front and back rails. The side rails 412 include inwardly projecting channel parts 417 secured by bolts 418 to suitable mating channel members 419 fixed to the front and rear corners, respectively, of the front and rear truss members. Removal of the bolts 418 and telescoping the parts 417 and 419 provide adjustment of the width of the machine frame, as will be obvious from inspection of FIG. 21.

Figure 22:
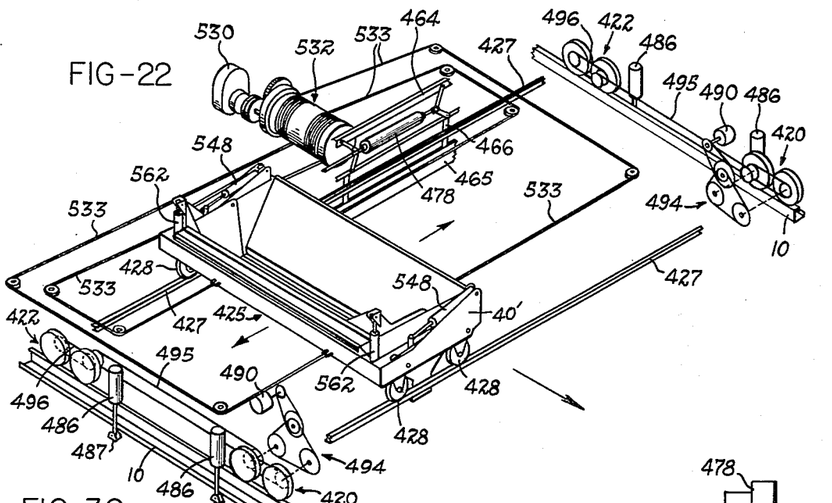
FIG. 22 is a schematic perspective view of the bucket control and traction system for the machine shown in FIG. 21.

At the corners of the frame there are supporting wheels, for example in the form of double wheel trucks 420 at the front and 422 at the rear (FIG. 22). These wheels are adapted for driving under selective control of the operator to provide a traction drive for the machine. A distributing bucket 425 is supported for movement transversely of the main frame, the support including rails 427 fixed to the fore and aft truss members, and upon which ride the bucket supporting rollers or wheels 428 (FIG. 22). The construction of the distributing bucket may be the same as either of those constructions previously described and shown in FIGS. 8–10.

*Strike-Off Screed and Control Linkage*

Figure 21:
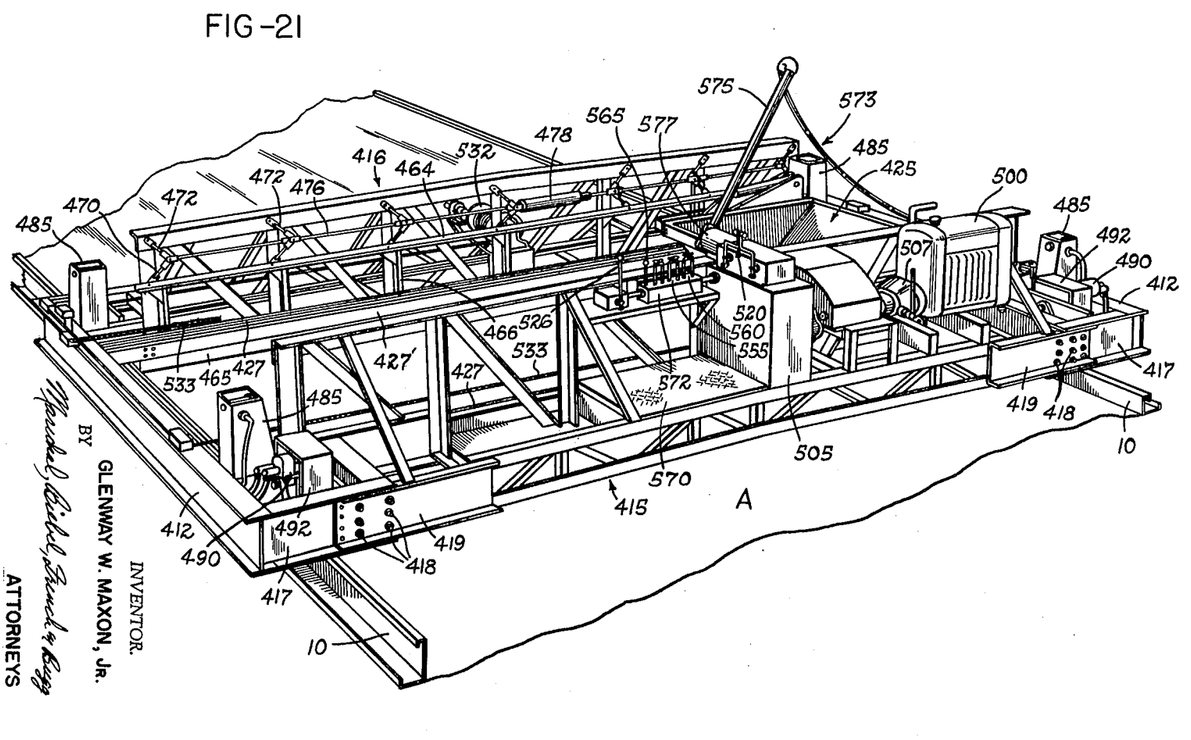
FIG. 21 is a perspective view of a modified construction of distributing machine in accordance with the invention.
Figures 23, 24, 25, 27:
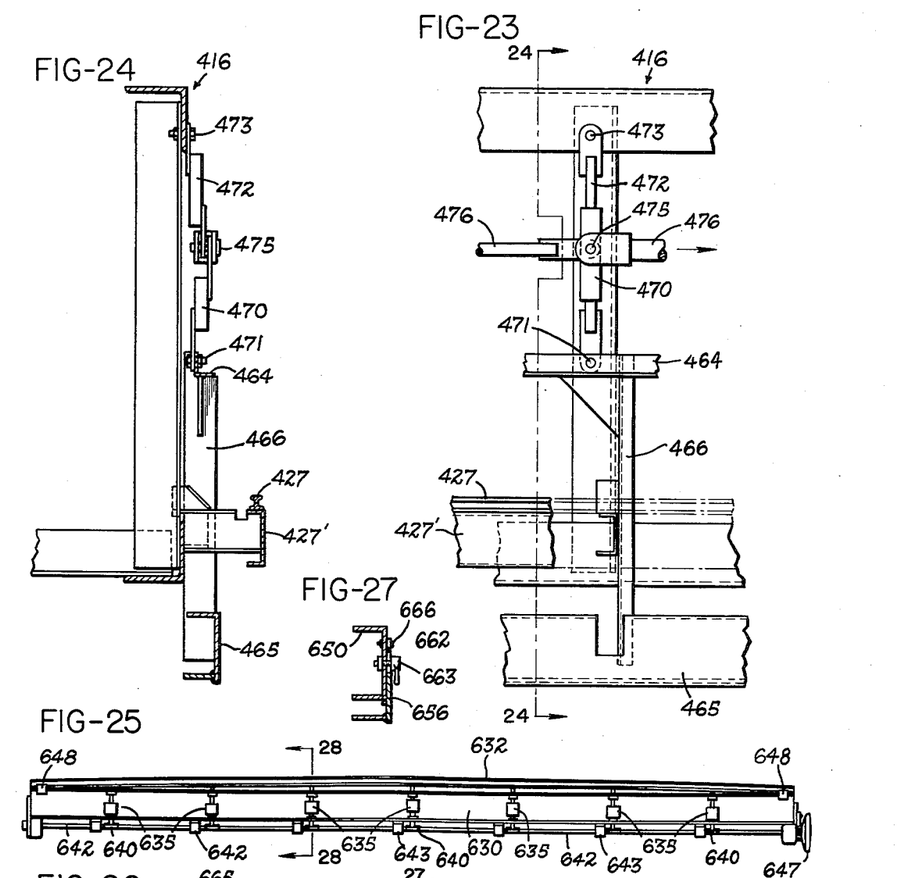
FIG. 23 is a detail view on an enlarged scale of the strike-off screed and its adjustment mechanism for the machine shown in FIG. 21.
FIG. 24 is a section taken on line 24—24 of FIG. 23.
FIG. 25 is a somewhat schematic view of a mechanism for adjusting the contour of the bucket supporting rails.
FIG. 27 is a section on an enlarged scale taken on line 27—27 of FIG. 26.

Referring to FIGS. 21, 23 and 24, at the forward face of the rear frame truss 416 there is a strike-off screed member which includes a framework having an upper rail 464 and a lower rail 465 which in this embodiment provides the screed or strike-off member, being connected at intervals to the upper rail by suitable vertical tie pieces 466. This framework is suspended from the rear main frame truss 416 by a number of toggle levers each including a lower arm 470 pivoted at 471 to the frame rail 464, and an upper arm 472 pivoted at 473 to the top rail of the rear truss 416. The arms 470 and 472 are joined at a central pivot 475, and each of the central pivot joints is connected to the same pivot joints on adjacent toggle linkages, as shown in FIG. 1, by operating rods 476.

Also as shown in FIG. 1, the toggle linkages on one side of the machine are arranged to break or bend in one direction, while those on the other side operate in the other direction. A piston-cylinder hydraulic motor 478 is connected into the operating bar 476 which joins the two adjacent toggle linkages which operate in the opposite directions, and thus expansion or contraction of this motor results in appropriate movement of the operating rods 476 to straighten or to break the toggle linkages, as the case may be, and thus to lower or raise the screed rail 465.

Therefore, after the distributing of each successive layer of concrete by bucket 425, as the machine moves forward over the forms 10 to distribute the next layer the screed contacts the surface of the previously laid concrete and operates to strike-off the surface in a manner well known in the art. Suitable adjustments in the contour of the screed 465 may be provided, as will presently be described.

Supporting Jacks

The quantity of concrete in the distributing bucket may vary. Obviously, in addition to the weight of the machine, the weight of this load of concrete imposes a considerable load upon the forms 10. While these forms usually are well anchored and rest upon firm ground, in some instances is may be desirable to provide support for the main frame in addition to that support provided through the wheels resting upon the forms. For this purpose, referring to FIGS. 21 and 22, at each of the four corners of the machine there is a box-like structure 485 which provides an inverted pedestal support for a hydraulic cylinder jack 486 (FIG. 22), the bottom of the jack having a ground engaging foot 487. If added support is required, the jacks 486 may be extended so that feet 487 engage the ground surface outside of the forms 10 and support part of the weight of the machine during the distributing operation, i.e., from the time the concrete is placed in the bucket until the bucket has completed its traverse. At that time, of course, the jacks will be withdrawn to permit the machine to advance to the next distributing position. Obviously, if desired similar supporting jacks may be incorporated in the machine shown in FIGS. 1–3.

Motive Drive

The drive for advancing the machine between such distributing operations may be provided by any suitable mechanism for rotating one or more of the wheels of the trucks 420 and 422. A suitable drive arrangement is disclosed in FIGS. 21 and 22, wherein reversible hydraulic motors 490 are supported within suitable housings 492 at the forward corners of the machine. Referring to FIG. 22, these motors drive both wheels of the front trucks 420 through suitable gear and sprocket reduction drive systems indicated generally at 494. The drive may in turn be transmitted to the wheels of the rear trucks through the drive chain 495 at each side of the machine and further drive chains 496 connecting the wheels of the rear trucks 422. By selective operation of the motors 490 the machine may be driven in forward or reverse directions over the rail forms 10.

Control System for Modified Machine

Figure 30:
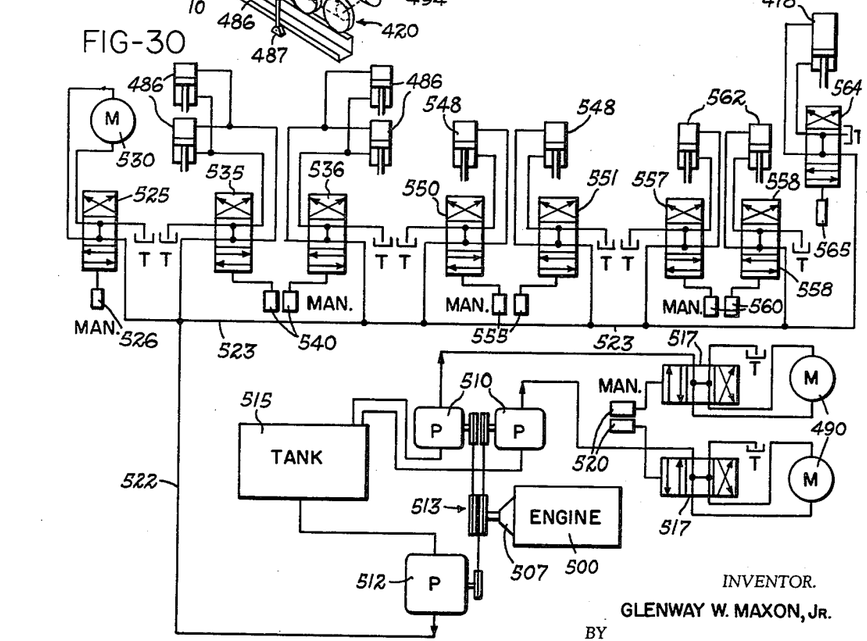
FIG. 30 is a hydraulic diagram of the drive and control circuits for the machine shown in FIG. 21.

The hydraulic control system for the machine shown in FIGS. 21–24 is shown in FIG. 30. The machine includes a prime mover 500 mounted on the forward truss member 415 and connected to drive a number of hydraulic pumps contained in housing 505 through a suitable transmission unit 507. As shown in FIG. 30, there are preferably three such pumps, the motive pumps 510 and the actuating fluid supply pump 512. These pumps are driven by any suitable connection with the transmission 507, such as indicated schematically at 513.

Each of the pumps 510 is connected to draw hydraulic fluid from a common supply tank 515, and each one of these pumps is connected to an associated drive motor 490 through a conventional three-way control valve 517. These valves include manual operating knobs 520 positioned immediately adjacent each other so that they may both be grasped with one hand to move them together into forward and reverse positions, or to the central off position, as indicated by the conventional diagrammatic showing of these valves. In this manner hydraulic fluid under pressure may be directed through the motors 490 to produce rotation thereof in either forward or reverse directions, as desired, to drive the entire distributing machine over the rails 10 in either forward or reverse directions as necessary.

The output line 522 of pump 512 is connected to a pressure fluid manifold line 523 which is arranged to supply operating hydraulic fluid under pressure through suitable control valves to the various hydraulic motor devices which power the different components of the distributing machine. Thus, a three-way winch control valve 525, of conventional type, having a manual operating handle 526, is connected to direct flow of hydraulic fluid under pressure in either direction through the hydraulic motor 530 which powers the bucket traversing winch 532, controlling the bucket traverse cables 533.

In the same manner, a pair of conventional three-way hydraulic valves 535 and 536, having manual control handles 540 arranged side by side as in the case of the controls 520, are connected to the jack operating motors 486, with the valve 535 controlling that pair of jacks on one side of the machine, and the valve 536 controlling the other pair as shown in FIG. 30. Accordingly, by simple one hand manipulation of the control handles 540 all of the jacks may be raised or lowered as necessary.

Figure 9:
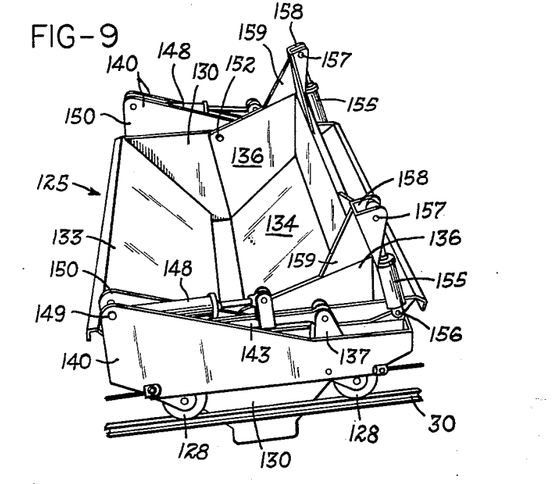
FIG. 9 is a perspective view of a modified distributing bucket.

The hydraulic motors 548 which control the raising and lowering of the distributing bucket are also selectively connected into the operating pressure fluid manifold 523, each through separate conventional three-way hydraulic control valves 550 and 551, each of these valves having a control handle 555, and these handles again being arranged side by side for operation with a single movement of one hand. The next pair of valves 557 and 558 in FIG. 30, also of the same conventional three-way type, are controlled by operators 560 which are placed side by side for the same reason, and these valves are connected to govern the supply of hydraulic fluid under pressure to the motors 562 which control opening and closing of the adjustable orifice in the distributing bucket such as shown in FIGS. 9 and 10. Finally, the screed elevation adjusting motor 478 receives operating fluid under pressure from manifold 523 through a control valve 564, movement of which is governed by a manual operating knob 565, so that appropriate adjustment of this valve will produce raising and lowering movements of the screed as desired.

Referring to FIG. 21, on the forward truss member 415 of the main frame there is an operators platform 570, and about this platform the various valves above described are mounted at a console 572 in such a manner that a single operator sitting or standing on this platform may, by appropriate manipulation of the valve control handles, regulate the forward and reverse movements of the entire machine, lowering and raising of the supporting jacks if their use is necessary, traversing of the distributing bucket 425, raising and lowering of this bucket to vary the depth of the layer of material distributed, variation in orifice opening for the purpose already described, and raising or lowering of screed 465 to correspond with the elevation of the bucket. The supply of hydraulic fluid under pressure and the return to tank for the motors 548 and 562, which move along with the distributing bucket, are provided through flexible conduits indicated generally at 573, it being understood that one of these constitutes a part of the pressure fluid supply manifold 523 and the other a tank return line. These conduits extend at one end from a boom member 575 which pivots about its central support 577 adjacent the center of the machine so that the conduits 573 follow the movements of the bucket in traversnig the main frame.

Crowned Surfaces

Figures 26, 28, 29:
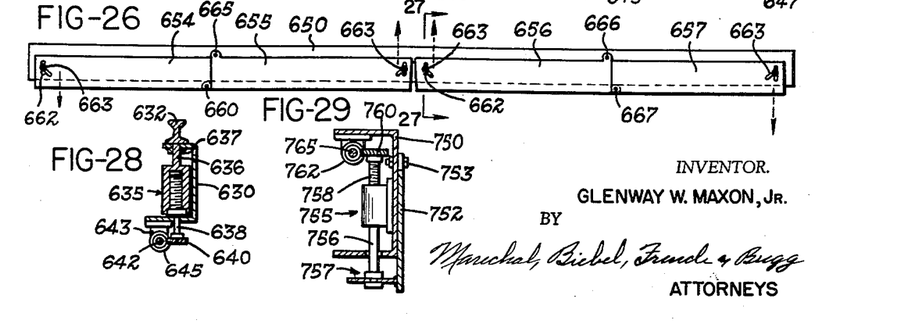
FIG. 26 is a schematic view of a modified type of screed which may be used in connection with the construction shown in FIGS. 23 and 24.
FIG. 28 is a section on an enlarged scale taken on line 28—28 of FIG. 25.
FIG. 29 is a vertical section through a suitable screed contour control apparatus which may be used in place of the apparatus shown in FIG. 12.

Accordingly, referring to FIG. 25, a suitable adjustment may be provided in the machine for changing the linearity of the bucket supporting rails 427. Such an adjustment may be provided in any number of different ways, for example, merely by placing wedges between rail 427 and the supporting structural rail 427' (FIGS. 23 and 24) on the rear main frame truss member 416. The apparatus shown diagrammatically in FIGS. 28 and 29 is one suitable type of single control apparatus for changing the contour of the rails.

In this apparatus the structural supporting member 630 is secured to the rear frame truss 416 in any suitable manner, as for example, in the manner shown in connection with member 427' in FIG. 24. Member 630 is channel-shaped in cross-section and the upper leg of the channel supports the bucket rail 632. Within the member 630 are a number of screw-jacks 635 having operating ram members 636 at their upper ends which pass through a guide piece 637 functioning to prevent rotation of the ram and through the upper leg of member 630 into contact with the under side of rail 632. The rotating screw member of jack 635 includes an operating shaft 638 extending through the bottom leg of member 630 and having a worm gear 640 secured to its lower end. An operating shaft 642 extends the width of the machine beneath member 630, being journaled therebeneath in a number of bearing blocks 643, and on this shaft are a number of worms 645, one for each of the jack units and associated worm gear 640.

Thus, when shaft 642 is rotated by the control wheel 647 at one side of the machine, if the various worm and worm gear combinations are of different pitch, or if the leads on the different screw jacks are of different pitch, the operating rams 636 may be caused to move through greater or less vertical distances. As shown in FIG. 25, these parts are arranged in such a manner that the center of rail 632 is raised proportionately higher than parts of the rail on opposite sides of the center, and the ends of rail 632 are anchored against vertical movement by suitable anchor blocks 648. Therefore, appropriate turning of wheel 647 will adjust the contour of rail 632 between straight and curved positions. Obviously, if desired the manual wheel 647 could be replaced by a suitable hydraulic motor and controls therefor, but in practice this has been found unnecessary since adjustment of the bucket supporting rails is required only at infrequent times.

*Modified Screed Contour Adjustment*

In connection with the above described adjustment of the bucket supporting rails from straight to curved or crowned positions, it is of course necessary to provide a corresponding adjustment in the screed rail or strike-off member. Referring to FIGS. 26 and 27, the rail 650 may be substituted for the lower rail 465 of the screed construction shown in FIGS. 23 and 24. On rail 650 there are supported a plurality of adjustable screed or strike-off elements, illustrated as the four segments 654, 655, 656 and 657. It is of course possible to provide more of these elements, but the construction may be amply described in the illustrated form. The member 654 is hinged at its lower right corner 660, as viewed in FIG. 26, to the lower edge of rail 650, and its other or left side includes a slot 662, through which a suitable clamping bolt 663 extends, being fixed to the center or vertical part of the rail 650.

One of the clamping arrangements, that for screed member 656, is shown in FIG. 27, wherein like reference numerals have been applied to the slot and to the clamping bolt, these reference numerals also applying to the like parts on the other screed elements. The element 655 is hinged at its upper left corner 665, and the slot and lock bolt construction is applied to the right side thereof. Similarly, element 656 is hinged at its upper right corner 666 with the lock bolt and slot construction at the left, adjacent the center of rail 650. Element 657 is hinged at its lower left corner 667 and the lock bolt and slot construction is provided at its right side, adjacent the end of rail 650. With this arrangement the individual screed elements 654—657 may be pivoted with respect to rail 650 about their respective hinge points, and the elements moved, for example, in the direction indicated by the arrows in FIG. 26, with elements 655 and 656 moving upwardly adjacent the center of rail 650, and elements 654 and 657 moving downwardly adjacent opposite ends of rail 650. Such movement will provide the desired crowned strike-off surface corresponding to a crowned condition of the rail 632.

If desired, the adjustments of the various screed elements just described may be made from a single control member by any number of suitable constructions. For example, referring to FIG. 29, a rail 750 is shown as supporting a screed element 752, hinged thereto at one corner by the bolt 753. A number of such screed elements appropriately hinged in the same manner as shown and described in connection with FIG. 23 may be provided. An adjusting jack screw 755 may be mounted upon the inner face of the vertical part of rail 750, and the operating ram 756 thereof extends through the lower leg of rail 750 to a connection with screed element 752 as shown generally at 757. The jack screw 758 includes a worm gear 760 at its upper end meshing with a worm 762 carried on a shaft 765 which is supported within rail 750 and extends the length thereof, having a suitable control wheel (not shown) at one end for movement by the machine operator. By providing appropriate left or right hand threads on the jack screws the individual screed elements may be pivoted upwardly or downwardly, as desired, to afford the required adjustment from flat to crowned strike-off surfaces. Again, rotation of shaft 765 could be accomplished through a suitable hydraulic drive motor or the equivalent, but since this adjustment need not be made very often, manual operation ordinarily is practical and sufficient.

*Summary*

The distributing machines provided by this invention are particularly useful in providing to the road building contractor maximum effectiveness in the so called "central mixing-non-agitating hauling" method of handling concrete and similar flowable materials. In such methods the paving material, such as concrete, is mixed in a central plant where consistent control and maximum production can be attained, and the material is discharged into special trucks which are particularly adapted to transport the concrete or other material. These trucks can be driven to the paving site, to one side of the forms 10, and the concrete or other material discharged directly into the distributing bucket of the machine. There is no working of the concrete back and forth, for example no bulldozing to level piles of concrete. The concrete remains in a mass from mixer to placement, and it is placed to the desired elevation at its initial point of deposit on the subgrade.

The machine extends beyond the forms only a minimum distance to protect the forms, thus allowing maximum shoulder width for the trucks to pass, the side rails 12 include the downwardly and inwardly extending skirts provided by the side plates 14 (FIGS. 5 and 6) to confine the concrete within the forms.

The distributing bucket may be traversed across the subgrade immediately upon loading to place the predetermined thickness of concrete or other paving material on the subgrade. The bucket discharge orifice may be controlled by the operator, as previously described, to determine the rate of flow, compensating for any slight variations in flow characteristics as in distributing concrete of varying "slump" characteristics. The height of the distributing bucket is adjustable for placing desired slab thickness, and for example the concrete may be placed in two courses with reinforcing mesh between the courses, or it may be placed to the full depth of the forms 10. Due to the gentle folding action of the concrete as it leaves the bucket discharge orifice, the concrete can be placed through and around mesh and joint reinforcing.

As the distributing machine moves ahead between placement operations the adjustable strike-off screed will strike off the placed material longitudinally, and the bucket can be returned to the loading side as the machine moves ahead, ready to receive its next load from a truck which has already been spotted and is prepared to load the bucket. Since the bucket discharge orifice can be fully closed, concrete or other paving materials may be transported by the distributing machine and placed at any location on the subgrade. The distribution operation can be stopped, started, or restarted at any point. Therefore, the machine is particularly useful in paving over bridges, causeways, or the like, where the loading trucks cannot proceed to the exact location of the paving. Since the single operator has complete control over the operations of the machine, he may close the bucket, raising it if necessary, take on a load of paving material, and drive the machine to an advanced paving location where the bucket height may be readjusted to give the desired depth of distributed material, the discharge orifice opened to the proper setting, and the bucket caused to traverse between the forms and distribute a full layer of concrete.

Since the height of the strike-off and finishing screeds may be adjusted by the operator, after the machine has advanced, performing its strike-off (and if desired finishing) operation, these screeds may be raised if it is necessary for the machine to travel in a reverse direction over already paved sections of the roadway to take on a further load.

As shown in the drawings, the spreader is supported by four trucks, one at each corner of the frame. The distance between the forward and rearward trucks is such that only one truck on each side will be on a single form section (ten feet) at any time. The pivoted mounting of the traction wheel trucks (at the rear), assures full bearing of all traction wheels on the forms at all times, and independent power and control of the two traction trucks permits free movement of the machine on curves. The control console and operator's platform are located centrally of the machine, preferably on the rear bridge or frame member as shown in the preferred machine of FIGS. 1–3. All operations of the machine may be controlled by manipulation of the hydraulic valves on the control console by a single operator, and in addition throttle control of the power unit may be provided in conventional fashion at the control console.

The placing rate for a machine such as disclosed herein is conservatively estimated at 180 cubic yards per hour for a bucket having a 4.5 cubic yard capacity. This rate is based on a 1.5 minute cycle of operation, allowing 60 seconds for loading, 15 seconds for placing and 15 seconds for movement and strike-off. Actual practice has shown that this rate may easily be maintained by the machine.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A machine for distributing flowable material comprising a main frame, means supporting said frame for movement along a defined path including drive means for driving said frame along such path, a distributing bucket, means supporting said bucket for movement across said frame in a direction generally normal to the path of movement of said frame, means defining a discharge orifice in said bucket, said orifice being elongated in a direction generally transverse to the direction of movement of said bucket, power drive means for moving said bucket across said frame, power operated means for regulating elevation of said orifice with respect to said bucket supporting means to control the depth of the layer of material distributed by said bucket as it traverses said frame, a screed supported across said frame rearwardly of said bucket and extending parallel to the direction of movement of said bucket for leveling the material distributed from said bucket as said frame is driven forward to a further distributing position, power operated means for controlling the elevation of said screed, means on said frame providing a centralized operator's station, and controls at said station connected to operate said frame drive means, said bucket drive means, said bucket elevation control, and said screed elevation by a single operator.

2. A machine as defined in claim 1 including means cooperating with said bucket supporting means for altering the path of traverse of said bucket between planar and curvilinear paths with respect to said frame to provide for selective distribution of the material in flat and crowned layers.

3. A self-powered machine for distributing freshly mixed concrete and the like in paving operations comprising a main frame, wheels on said frame supporting said frame for movement along a path to be paved, drive means connected to at least one of said wheels for moving said frame along said path, a prime mover supported on said frame providing a source of power, means including a drive control for applying power from said prime mover to said wheel drive means, a distributing bucket, track means extending across said frame and supporting said bucket for movement with respect to said frame in a direction generally normal to the path of movement of said frame, means defining a discharge orifice in said bucket, said orifice being elongated in a direction generally transverse to the direction of movement of said bucket for distributing a ribbon of concrete across the path to be paved, drive means connected to move said bucket across said frame along said track means, means including a bucket traverse control for applying power from said prime mover to said bucket drive means, means regulating elevation of said orifice with respect to said frame, elevation control means for selectively applying power from said prime mover to said orifice elevation regulating means, and means supporting all of said aforementioned control means at a single station on said frame providing for control by a single operator over advancing movement of said frame, distributing movement of said bucket, and thickness of the layer of concrete distributed from said bucket.

4. A machine as defined in claim 3, including means for controlling the size of said discharge orifice to regulate the flow of material from said bucket.

5. A machine as defined in claim 3, including adjustable extensions on said frame providing for expansion and contraction of the width thereof and including extensions for said track means, and wherein said drive means for moving said bucket includes a winch and cables extending therefrom to the opposite sides of said frame and connected to opposite sides of said bucket for moving said bucket in either direction across said frame in response to forward and reverse operation of said winch, and guides on said frame and on said extension means receiving said cables and cooperating to provide for automatic accommodation of frame width expansion within the cable length.

6. A machine for distributing flowable material comprising a generally rectangular main frame including front and rear frame rails connected at their opposite ends by side rail members, wheel carrying trucks mounted at the forward and rear ends of said side rail members and having wheels adapted to engage rail-like forms between which material is to be distributed, said frame being adapted for movement along said form members, a pair of bucket supporting rails extending in spaced parallel relation across said frame between said side rail members and adjacent said front and rear frame rails respectively, a bucket supporting carriage having rollers engaged with said bucket supporting rails for guidance across said frame, a distributing bucket mounted in said supporting carriage and having a discharge opening at the lower end thereof elongated in a direction from front to rear of said main frame, drive means connected for selective traversing movement of said bucket across said frame to distribute material deposited therein between the forms over which said main frame travels, a strike-off screed depending from said rear frame rail for positioning adjacent said forms to strike off material deposited between said forms by said bucket during forward movement of said machine over the forms between distributing operations of said bucket, a height control motor connected between said bucket carriage and said rollers thereon for controlling the elevation of said bucket discharge orifice with respect to the forms upon which said main frame is supported, and remote controls for operating said bucket height control motor including a flexible supply line extending between a stationary position on said frame and said bucket carriage to accommodate the traversing distributing movement of said carriage and said bucket.

7. A machine as defined in claim 6, including retractable supporting jacks connected to the corners of said frame, ground engaging feet on said jacks for selective contact with the ground surface to relieve said wheels of at least a portion of the weight load, and control means operatively connected to said jacks providing for selective movement thereof to ground engaging position during a distributing operation of said bucket and to a raised position during movement of said frame over the forms.

References Cited in the file of this patent
UNITED STATES PATENTS

| | | |
|---|---|---|
| Re. 20,611 | Nickerson | Jan. 4, 1938 |
| 1,524,403 | Merwin | Jan. 27, 1925 |
| 1,662,257 | Valerio | Mar. 13, 1928 |
| 1,724,043 | Robb | Aug. 13, 1929 |
| 1,897,605 | Clifford | Feb. 14, 1933 |
| 1,995,450 | French | Mar. 26, 1935 |
| 2,026,241 | McCrery | Dec. 31, 1935 |
| 2,054,437 | Mosel | Sept. 15, 1936 |
| 2,123,989 | Day | July 19, 1938 |
| 2,187,080 | Heltzel | Jan. 16, 1940 |
| 2,219,246 | Jackson | Oct. 22, 1940 |
| 2,299,700 | Millikin et al. | Oct. 20, 1942 |
| 2,479,800 | Williams | Aug. 23, 1949 |
| 2,552,691 | Saunders | May 15, 1951 |
| 2,583,108 | Lewis | Jan. 22, 1952 |
| 2,589,257 | Horning | Mar. 18, 1952 |
| 2,601,277 | Green | June 24, 1952 |
| 2,650,525 | Jones | Sept. 1, 1953 |
| 2,663,231 | Wood | Dec. 22, 1953 |
| 2,789,485 | Lindgren | Apr. 23, 1957 |